United States Patent
Sato

[11] Patent Number: 5,953,677
[45] Date of Patent: Sep. 14, 1999

[54] MOBILE TELEPHONE APPARATUS WITH POWER SAVING

[75] Inventor: Yukio Sato, Yokohama, Japan

[73] Assignee: Matsushita Electric Industrial Co., Ltd., Osaka, Japan

[21] Appl. No.: 08/925,923

[22] Filed: Sep. 8, 1997

[30] Foreign Application Priority Data

Sep. 27, 1996 [JP] Japan ................................ 8-256104

[51] Int. Cl.⁶ ............................. H04B 1/16; H04B 7/26
[52] U.S. Cl. ......................... 455/574; 455/421; 455/456; 455/127; 455/38.3
[58] Field of Search .................................... 455/574, 572, 455/127, 456, 421, 343, 38.3

[56] References Cited

U.S. PATENT DOCUMENTS

| | | | |
|---|---|---|---|
| 4,903,319 | 2/1990 | Kasai et al. | 455/574 |
| 5,134,708 | 7/1992 | Marui et al. | 455/421 |
| 5,594,951 | 1/1997 | Bellin | 455/127 |
| 5,832,386 | 7/1994 | Nojima et al. | 455/421 |

FOREIGN PATENT DOCUMENTS 6311079  11/1994  Japan ............................. H04B 7/26

Primary Examiner—Reinhard J. Eisenzopf
Assistant Examiner—Duc Nguyen
Attorney, Agent, or Firm—Pollock, Vande Sande & Amernick

[57] ABSTRACT

A mobile telephone apparatus is disclosed which comprises: a radio communication circuit having an antenna for receiving a radio wave signal and outputting a reception signal; a judging circuit responsive to the reception signal for judging whether the mobile telephone apparatus is inside or outside a service area; a detection circuit for detecting whether the mobile telephone apparatus is in a moving condition or a static condition; a power supply for supplying a power to the radio communication circuit; and a control circuit responsive to the judging circuit and the detection circuit for stopping supplying the power to the radio communication circuit when the mobile telephone apparatus is outside the service area and the mobile telephone apparatus is in the static condition. The detection circuit may comprises a acceleration sensor, a vibration sensor, a vehicle speed meter. The power consumption is further reduced by making the microprocessor and the acceleration sensor in a sleep mode. Intervals of the power saving mode can be displayed.

6 Claims, 3 Drawing Sheets

MOBILE TELEPHONE APPARATUS WITH POWER SAVING

BACKGROUND OF THE INVENTION

1. Field of the Invention

This invention relates to a mobile telephone apparatus with power saving.

2. Description of the Prior Art

A mobile telephone apparatus with power saving is known. In such a mobile telephone apparatus effects intermittent receiving outside a service area to save a power consumption because there is a possibility that the mobile telephone apparatus moves to inside of the service area.

Japanese patent application provisional publication No. 063111079 A discloses a prior art mobile telephone set with automatic power-off function. In this prior art mobile telephone set, there is a function interrupting power of a power supply automatically when the mobile telephone set comes at the outside of a zone of the service network.

SUMMARY OF THE INVENTION

The aim of the present invention is to provide an improved mobile telephone apparatus with power saving.

According to the present invention, a mobile telephone apparatus is provided, which comprises: a radio communication circuit having an antenna for receiving a radio wave signal and outputting a reception signal; a judging circuit responsive to the reception signal for judging whether the mobile telephone apparatus is inside or outside a service area of the radio Wave signal; a detection circuit for detecting whether the mobile telephone apparatus is in a moving condition or a static condition; a power supply for supplying a power to the radio communication circuit; and a control circuit responsive to the judging circuit and the detection circuit for stopping supplying the power to the radio communication circuit when the mobile telephone apparatus is outside the service area and the mobile telephone apparatus is in the static condition.

The mobile telephone apparatus mentioned above, may further comprise: a clock circuit for measuring a first interval of stopping supplying the power to the radio wave communication circuit, a second interval in the moving condition and displaying circuit for displaying the first interval and the second interval.

In the mobile telephone apparatus, the detection circuit comprises an accelerometer for detecting acceleration of the mobile telephone apparatus.

In the mobile telephone apparatus, the detection circuit comprises a vibration sensor for detecting a vibration of the mobile telephone apparatus.

In the mobile telephone apparatus, the detection circuit comprises a receiving circuit for receiving a vehicle speed signal indicative of a vehicle on which the mobile telephone apparatus is mounted.

The mobile telephone apparatus may further comprise: a clock circuit for measuring a first interval of stopping supplying the power to the radio wave communication circuit, a second interval in the moving condition and a displaying circuit for displaying the first interval and the second interval, wherein the detection circuit comprises a receiving circuit for receiving a vehicle speed signal indicative of a vehicle on which the mobile telephone apparatus is mounted.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

<FIRST EMBODIMENT>

Figure 1:
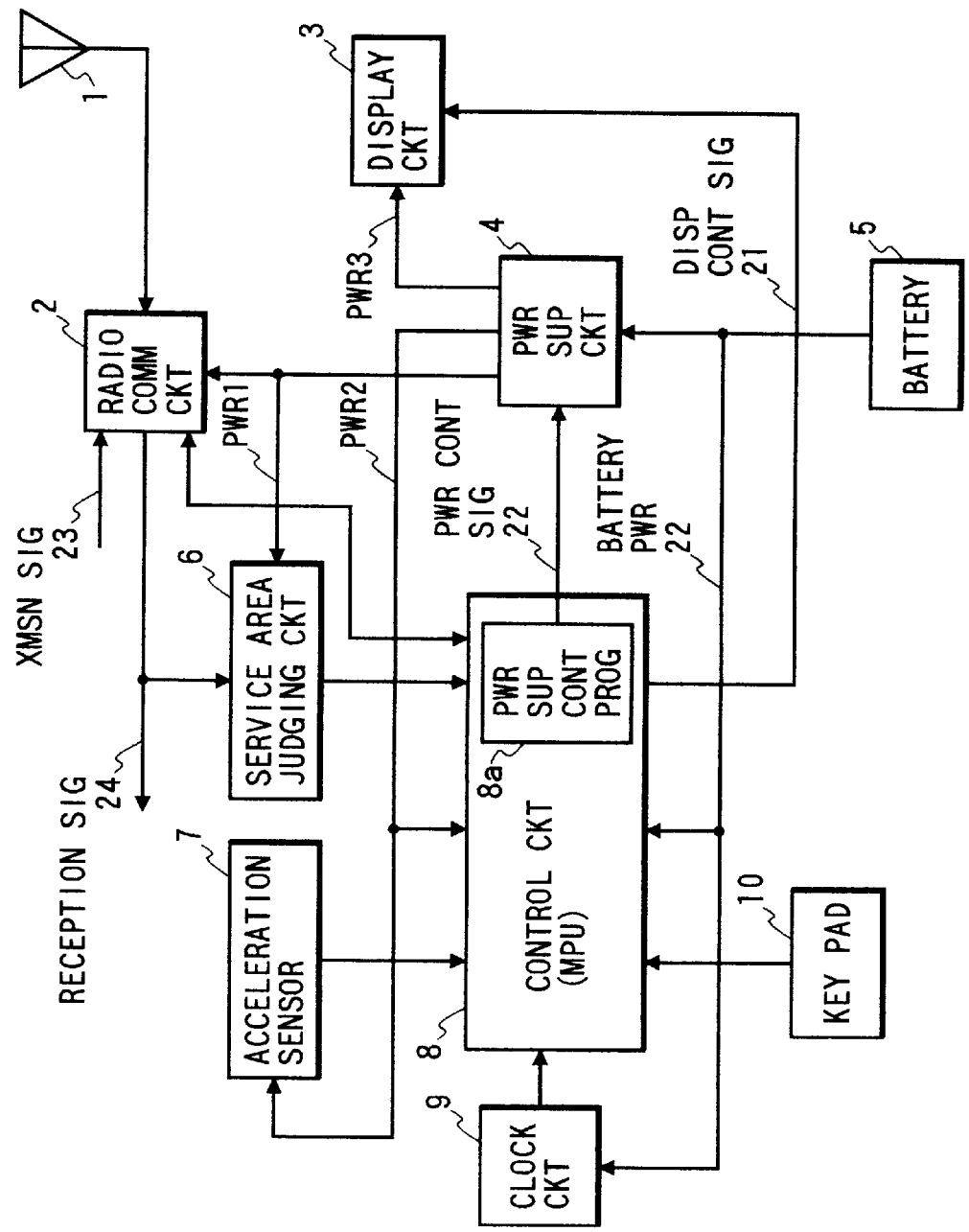
FIG. 1 is a block diagram of a mobile telephone apparatus of a first embodiment.

FIG. 1 is a block diagram of a mobile telephone apparatus of a first embodiment.

The mobile telephone apparatus of the first embodiment comprises a radio communication circuit 2 including an antenna for receiving a radio wave signal from a base station (not shown) and for transmitting a transmission signal, a service area judging circuit 6 for judging whether the mobile telephone apparatus is inside or outside the service area from the reception signal 24, an acceleration sensor (accelerometer) 7 for detecting acceleration of the mobile telephone apparatus, a clock circuit (timer) 9 for generating a present time signal and a timer signal, a key pad 10 for generating an operation signal, a control circuit 8 (microprocessor) for controlling respective circuits of the mobile telephone apparatus in response to outputs of the radio wave communication circuit 2, the service area judging circuit 6, the acceleration sensor 7, the clock circuit 9, and the operation signal, a display circuit 3 for displaying information from,the control circuit 8, and a power supply for supplying first to third power PWR1 to PWR3 from a battery power from a battery 5 under control by the control circuit 8.

The first power PWR1 is supplied to the radio communication circuit 2 and the service area judging circuit 6.

An operation will be described.

The radio communication circuit 2 receives the radio wave signal from a base station through the antenna 1 and transmits the transmission signal. The service area judging circuit 6 judges whether the mobile telephone apparatus is inside or outside the service area from the reception signal 24. That is, if a control signal in the radio wave signal can be received correctly, the service area judging circuit 6 judges that the mobile telephone apparatus is inside the service area and if the control signal in the radio wave signal cannot be received correctly, the service area judging circuit 6 judges that the mobile telephone apparatus is outside the service area. The acceleration sensor 7 detects acceleration of the mobile telephone apparatus. When the acceleration sensor 7 shows an intermediate voltage in its dynamic range, the control circuit judges that the mobile telephone apparatus is in the static condition. When the voltage of the acceleration sensor 7 shows other voltages in its dynamic range, the control circuit judges that the mobile telephone apparatus is in the moving condition. The clock circuit 9 generates the present time signal and the timer signal for measuring an event in response to the control circuit 8. The key pad 10 generates the operation signal such as a dial signal and includes an ON/OFF switch (not shown) and a HOOK switch (not shown). The control circuit 8 controls respective circuits in accordance with a control program mentioned later. The display circuit 3 displays information from the control circuit 8. The power supply supplies first to third power PWR1 to PWR3 from a battery power from a battery 5 in a power-on condition. In a power save mode, the power supplying circuit 4 stops supplying the power PWR1 to the radio communication circuit 2 and to the service area judging circuit 6.

Figure 2:
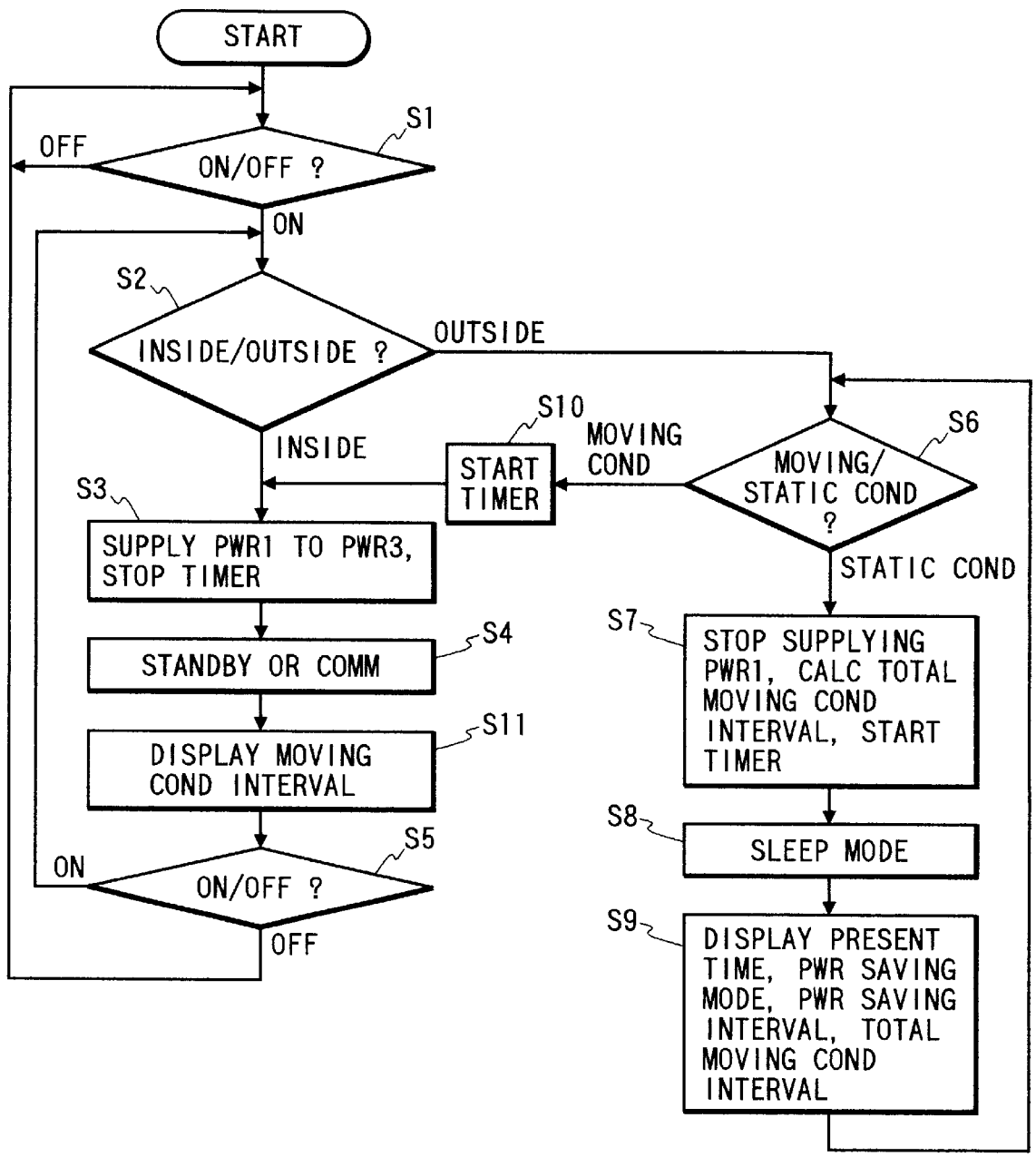
FIG. 2 depicts a flow chart of the control program stored in the microprocessor 8.

FIG. 2 depicts a flow chart of the control program stored in the microprocessor (mpu) 8.

The microprocessor 8 judges whether the ON/OFF switch is in the OFF or the ON condition in step s1. If the ON/OFF switch is in the ON condition, the microprocessor 8 judges whether the mobile telephone apparatus is inside or outside the service area from the reception signal in step s2. If the mobile telephone apparatus is inside the service area, the microprocessor 8 operates the power supply circuit 4 to supply all of powers PWR1 to PWR3 in step s3. In the following step s4, the microprocessor 8 effects controlling of a standby operation (intermittent receiving) or a communication condition. In the following step s11, the microprocessor 8 displays a moving condition interval from the timer signal which is derived from step s10 mentioned later. Then, the microprocessor 8 judges whether the ON/OFF switch is in the OFF or the ON condition. If the ON/OFF switch is in the ON condition, processing returns to step s2. If the ON/OFF switch is in the OFF condition, processing returns to step s1.

In step s2, if the mobile telephone apparatus is outside the service area, the microprocessor 8 judges whether the mobile telephone apparatus is in the moving condition or the static condition in step s6. If the mobile telephone apparatus is in the moving condition processing proceeds to step s10 where the microprocessor 8 operates the clock circuit 9 to generate the timer signal indicative of the moving condition. Then, processing proceeds to step s3 to perform the standby or communication operation and the moving condition interval is displayed in step s11 as mentioned.

If the mobile telephone apparatus is in the static condition, the microprocessor 8 stops supplying the power PWR1 to the radio communication circuit 2 and to the service area judging circuit in step s7, calculates a total moving condition interval, and starts the timer to measure the power saving mode interval. In the following step s8, the microprocessor 8 makes the microprocessor 8 itself and the acceleration sensor 7 in a sleep mode to reduce the power consumption, starts the timer in the clock circuit for generating the timer signal, and displays the total moving condition interval. The acceleration sensor 7 consumes a power less than 1 mA in the sleep mode.

In the following step s9, the microprocessor 8 displays an interval of stopping supplying power PWR1 from the timer signal and displays the present time from the clock circuit 9. Then, processing returns to step s6.

Figure 3:
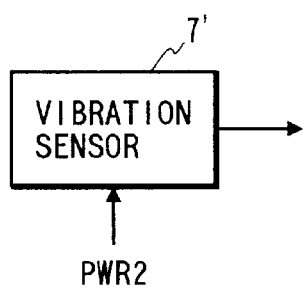
FIG. 3 is a partial block diagram of a modification.

FIG. 3 is a partial block diagram of a modification. In this modification, a vibration sensor 7' is used instead the acceleration sensor 7. The displaying in the sleep mode may be only effected in response to a command from the key pad 10 to further reduce the power consumption.

<SECOND EMBODIMENT>

Figure 4:
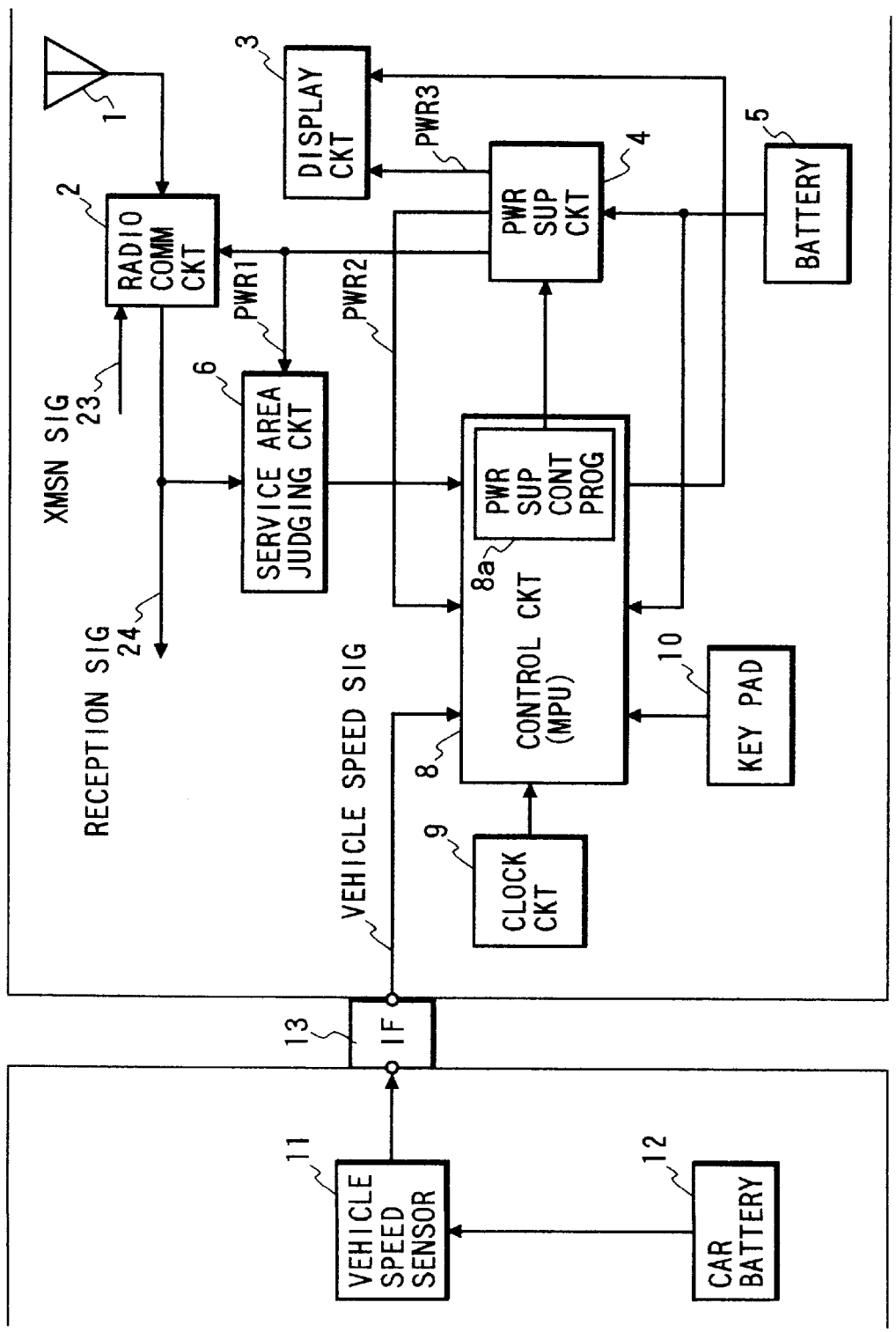
FIG. 4 is a block diagram of a mobile telephone apparatus of a second embodiment.

FIG. 4 is a block diagram of a mobile telephone apparatus of a second embodiment.

The mobile telephone apparatus of the second embodiment is substantially the same as that of the first embodiment. The difference is that a vehicle speed sensor 11 replaces the acceleration sensor 7 and an interface circuit 13 for interfacing the vehicle speed sensor with the control circuit 8 is further provided. The vehicle speed sensor 11 detects a speed of a vehicle to which the mobile telephone apparatus is provided and supplies the vehicle speed signal to the control circuit 8 through the interface circuit 13. The interface circuit 13 comprises two sets of contacts, namely, one set for the vehicle speed sensor 11 and another for the ground line and effects interfacing when the mobile telephone apparatus is placed on a holder (not shown) provided to the vehicle. The holder has the contacts. Moreover, an infrared coupling using photo-diodes or a magnetic coupling can be used for the interfacing.

What is claimed is:

1. A mobile telephone apparatus comprising:

radio communication means having an antenna for receiving a radio wave signal and outputting a reception signal;

judging means responsive to said reception signal for judging whether said mobile telephone apparatus is inside or outside a service area of said radio wave signal;

detection means for detecting whether said mobile telephone apparatus is in a moving condition or a static condition;

a power supply for supplying a power to said radio communication means; and control means responsive to said judging means and said detection means for stopping supplying said power to said radio communication means when said mobile telephone apparatus is outside said service area and said mobile telephone apparatus is in said static condition.

2. The mobile telephone apparatus as claimed in claim 1, further comprising: a clock circuit for measuring a first interval of stopping supplying said power to said radio wave communication means, a second interval in said moving condition and displaying means for displaying said first interval and said second interval.

3. The mobile telephone apparatus as claimed in claim 1, wherein said detection means comprises an accelerometer for detecting acceleration of said mobile telephone apparatus.

4. The mobile telephone apparatus as claimed in claim 1, wherein said detection means comprises a vibration sensor for detecting a vibration of said mobile telephone apparatus.

5. The mobile telephone apparatus as claimed in claim 1, wherein said detection means comprises receiving means for receiving a vehicle speed signal indicative of a vehicle on which said mobile telephone apparatus is mounted, said detection means detecting whether said mobile telephone apparatus is in said moving condition or said static condition from said vehicle speed signal.

6. The mobile telephone apparatus as claimed in claim 1, further comprising: a clock circuit for measuring a first interval of stopping supplying said power to said radio wave communication means, a second interval in said moving condition and displaying means for displaying said first interval and said second interval, wherein said detection means comprises receiving means for receiving a vehicle speed signal indicative of a vehicle on which said mobile telephone apparatus is mounted.

* * * * *